United States Patent
Moriwaki et al.

(10) Patent No.: US 6,545,675 B1
(45) Date of Patent: Apr. 8, 2003

(54) THREE-DIMENSIONAL GRAPHICS SYSTEM, PROCESSOR AND RECORDING MEDIUM

(75) Inventors: Shohei Moriwaki, Tokyo (JP); Yoshifumi Azekawa, Tokyo (JP); Osamu Chiba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,947

(22) Filed: May 17, 2000

(30) Foreign Application Priority Data

Nov. 2, 1999 (JP) .......................................... 11-312328

(51) Int. Cl.[7] .............................................. G06T 17/00
(52) U.S. Cl. ...................................... 345/419; 345/420
(58) Field of Search ................................ 345/418, 419, 345/420, 423, 424

(56) References Cited

FOREIGN PATENT DOCUMENTS

| JP | 1-287788 | 11/1989 |
|---|---|---|
| JP | 6-59665 | 3/1994 |

*Primary Examiner*—Cliff N. Vo
(74) *Attorney, Agent, or Firm*—Burns, Doane, Swecker & Mathis, LLP

(57) ABSTRACT

Original data consisting of three-dimensional coordinate data, color, α-value and the like of a polygon, which is obtained through a geometrical operation by a geometrical operation processing unit (2) on the basis of polygon definition data (1) is stored into a memory (4A or 4B) in advance as geometrical-operation processed three-dimensional data (D1). That allows generation of three-dimensional graphics drawing data only by a drawing operation processing unit (3) on the basis of the geometrical-operation processed three-dimensional data (D1) stored in the memory (4B). With this constitution, a three-dimensional graphics system which ensures reduction in cost and power consumption can be obtained.

12 Claims, 6 Drawing Sheets

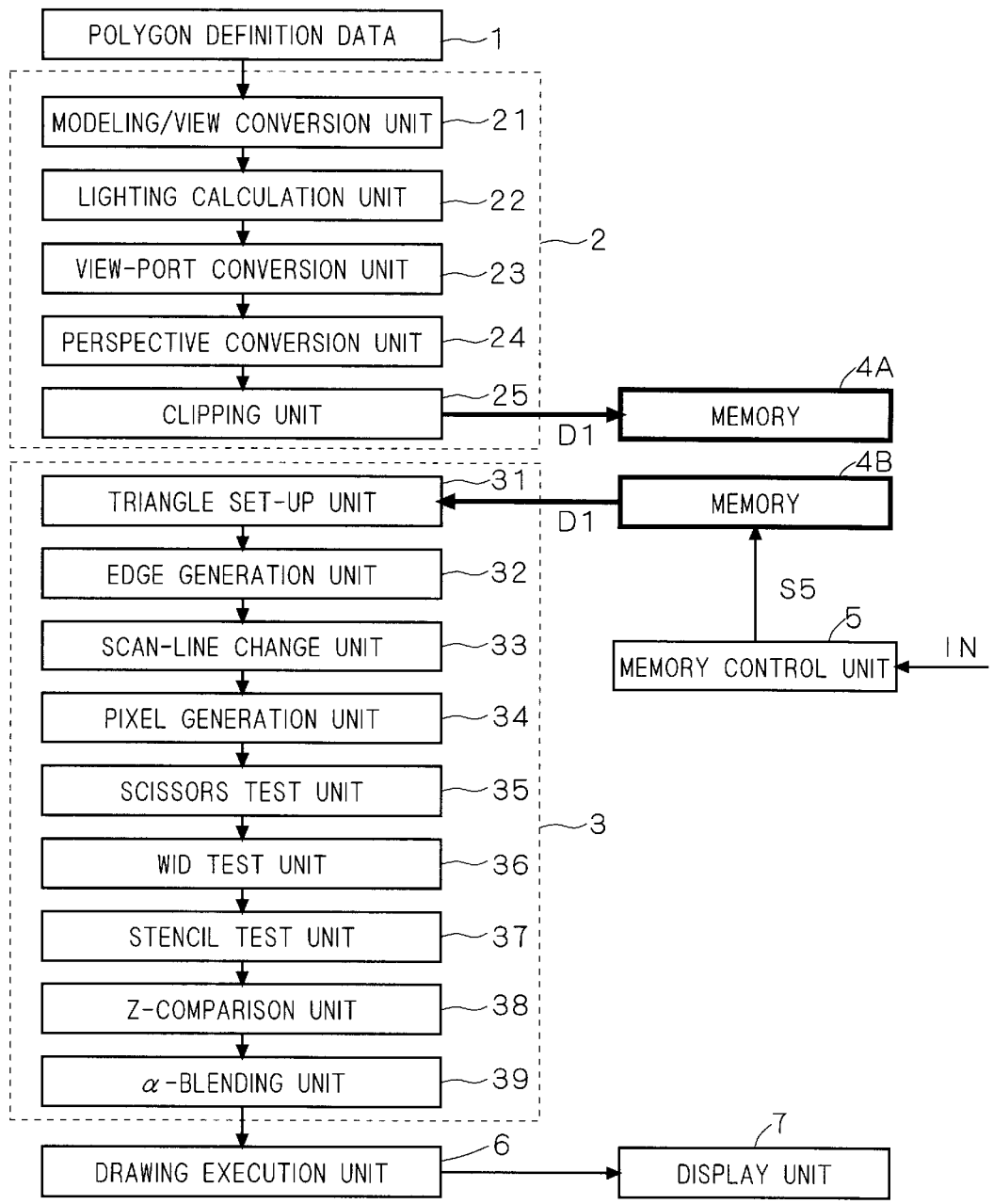
F I G. 1

THREE-DIMENSIONAL GRAPHICS SYSTEM, PROCESSOR AND RECORDING MEDIUM

BACKGROUND OF THE INVENTION

1. Field of the Invention

The present invention relates to a three-dimensional graphics system which can perform a three-dimensional graphics display with relatively simple circuit configuration, and a drawing operation processing device and a nonvolatile memory device constituting the three-dimensional graphics system.

2. Description of the Background Art

FIG. 6 is a block diagram showing a constitution of a background-art three-dimensional graphics system. As shown in this figure, polygon definition data 1 mainly described in a program undergoes a geometrical operation and a drawing operation by a three-dimensional graphics processing unit 20 and then it is displayed in three-dimensional graphics on a display unit 7 by a drawing execution unit 6. The polygon definition data 1 includes color data as well as three-dimensional data with respect to vertices of a polygon.

The operations of the three-dimensional graphics processing unit 20 is separately executed by a not-shown geometrical operation pipeline processing execution unit and a not-shown drawing operation pipeline processing execution unit.

The drawing execution unit 6 captures three-dimensional graphics drawing data (RGB α) pixel by pixel, which is obtained by executing the above geometrical operation pipeline processing and drawing operation pipeline processing on the polygon definition data 1 and writes the three-dimensional drawing data into a predetermined region of a frame memory, to perform a pixel actual-generation for actually displaying three-dimensional graphics on (the two-dimensional screen) of the display unit 7.

To perform the above three-dimensional graphics operation in real time, it is necessary to use a dedicated processing unit or a processor having a sufficiently-high operation performance as the three-dimensional graphics processing unit 20, and that raises a problem of high cost and power consumption needed for the three-dimensional graphics processing unit 20.

SUMMARY OF THE INVENTION

The present invention is directed to a three-dimensional graphics system. According to a first aspect of the present invention, the three-dimensional graphics system comprises: nonvolatile memory means for storing first-operation processed data obtained by performing at least part of geometrical operation, the geometrical operation generating a three-dimensional polygon on the basis of data defining the three-dimensional polygon; second-operation processing means connected to the nonvolatile memory means to read the first-operation processed data therefrom, for generating graphics drawing data corresponding to the three-dimensional polygon on the basis of the first-operation processed data; and display means for displaying three-dimensional graphics on a two-dimensional screen on the basis of the graphics drawing data.

According to a second aspect of the present invention, in the three-dimensional graphics system according to the first aspect, the first-operation processed data includes three-dimensional data obtained by performing all the geometrical operation.

According to a third aspect of the present invention, in the three-dimensional graphics system according to the first aspect, the first-operation processed data includes three-dimensional data obtained by performing all the geometrical operation and part of a processing by which the graphics drawing data is obtained from the three-dimensional polygon.

According to a fourth aspect of the present invention, in the three-dimensional graphics system according to the first aspect, the first-operation processed data includes a plurality of first-operation processed data, and the three-dimensional graphics system further comprising: read control means receiving an external input signal, for controlling a read operation of selectively reading the first-operation processed data from the plurality of first-operation processed data stored in the nonvolatile memory means on the basis of the external input signal.

According to a fifth aspect of the present invention, the three-dimensional graphics system according to the first aspect further comprises: high-speed read memory means capable of a read operation faster than the nonvolatile memory means, being interposed between the nonvolatile memory means and the second-operation processing means, and in the three-dimensional graphics system of the fifth aspect, the second-operation processing means reads the first-operation processed data from the nonvolatile memory means through the high-speed read memory means.

The present invention is also directed to a processor. According to a sixth aspect of the present invention, the processor has: data read means for reading data from a predetermined nonvolatile memory device storing first-operation processed data obtained by performing at least part of geometrical operation, the geometrical operation generating a three-dimensional polygon on the basis of data defining the three-dimensional polygon; and data processing means for generating graphics drawing data corresponding to the three-dimensional polygon on the basis of the first-operation processed data read out from the predetermined nonvolatile storage device.

The present invention is further directed to a computer-readable recording medium. According to a seventh aspect of the present invention, the computer-readable recording medium has nonvolatility, and recording first-operation processed data obtained by performing at least part of geometrical operation on the basis of data defining a three-dimensional polygon.

The second-operation processing means in the three-dimensional graphics system of the first aspect of the present invention generates the graphics drawing data corresponding to the three-dimensional polygon on the basis of the first-operation processed data obtained from the nonvolatile memory.

Since the first-operation processed data is data after undergoing at least part of the geometrical operation, by generating the graphics drawing data by the second-operation processing means on the basis of the first-operation processed data, the three-dimensional graphics display can be performed without at least part of the geometrical operation, thereby ensuring reduction in cost and power consumption.

In the three-dimensional graphics system of the second aspect, since the first-operation processed data includes data obtained by performing all the geometrical operation, by generating the graphics drawing data by the second-operation processing means on the basis of the first-operation processed data, the three-dimensional graphics display can be performed without all the geometrical operation, thereby ensuring reduction in cost and power consumption.

In the three-dimensional graphics system of the third aspect, since the first-operation processed data includes data obtained by performing all the geometrical operation and part of the operation for obtaining the graphics drawing data from the polygon, by generating the graphics drawing data by the second-operation processing means on the basis of the first-operation processed data, the three-dimensional graphics display can be performed without all the geometrical operation and the part of the operation for obtaining the graphics drawing data from the polygon, thereby ensuring reduction in cost and power consumption.

In the three-dimensional graphics system of the fourth aspect, by giving the external input signal to the read control means, it is possible to externally control the content of the three-dimensional graphics display.

In the three-dimensional graphics system of the fifth aspect, by interposing the high-speed read memory means between the nonvolatile memory means and the second-operation processing means to achieve a high-speed read of the first-operation processed data, the operation by the second-operation processing means can be performed at higher speed.

In the processor of the sixth aspect, since an operation for obtaining the graphics drawing data from the polygon on the basis of the first-operation processed data read out from the predetermined nonvolatile memory device to generate the graphics drawing data, the three-dimensional graphics system capable of generating the graphics drawing data can be constituted of the predetermined nonvolatile memory device storing the first-operation processed data and the processor at relatively low cost.

Since the recording medium of the seventh aspect stores the first-operation processed data obtained by performing at least part of the geometrical operation on the basis of the three-dimensional polygon definition data, by providing a drawing computer for reading the first-operation processed data from the recording medium and performing the operation for obtaining the graphics drawing data from the three-dimensional polygon on the basis of the read first-operation processed data to generate the graphics drawing data, the combination of the recording medium and the computer can constitutes the three-dimensional graphics system at relatively low cost.

An object of the present invention is to provide a three-dimensional graphics system which ensures reduction in cost and power consumption.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a constitution of a three-dimensional graphics system in accordance with a first preferred embodiment of the present invention;

DESCRIPTION OF THE PREFERRED EMBODIMENTS

<The First Preferred Embodiment>

Figure 2:
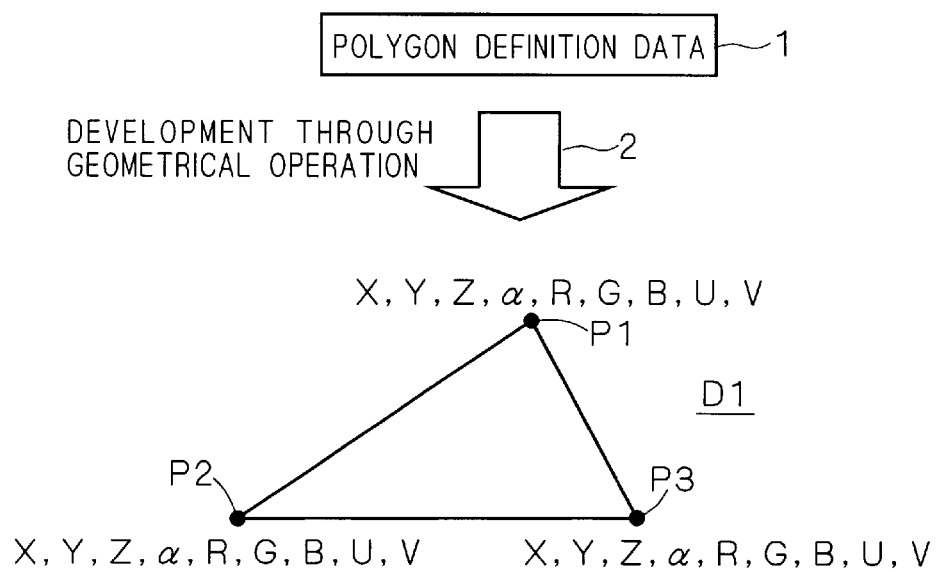
FIG. 2 is an illustration of a relation between polygon definition data and first-operation processed data in accordance with the first preferred embodiment.

FIG. 1 is a block diagram showing a constitution of a three-dimensional graphics system in accordance with the first preferred embodiment of the present invention. As shown in FIG. 1, the three-dimensional graphics system in accordance with the first preferred embodiment is constituted of a geometrical operation processing unit 2, a drawing operation processing unit 3, memories 4A and 4B, a memory control unit 5 and the drawing execution unit 6.

The geometrical operation processing unit 2 is constituted of the geometrical operation pipeline processing execution unit consisting of a modeling/view conversion unit 21, a lighting calculation unit 22, a view-port conversion unit 23, a perspective conversion unit 24 and a clipping unit 25, and performs a geometrical operation on the basis of the polygon definition data 1 by the constituent units 21 to 25. Further, the geometrical operation processing unit 2 stores geometrical-operation processed three-dimensional data D1 which is finally obtained from the clipping unit 25 into the memory 4A.

The drawing operation processing unit 3 is constituted of the drawing operation pipeline processing execution unit consisting of a triangle set-up unit 31, an edge generation unit 32, a scan-line change unit 33, a pixel generation unit 34, a scissors test unit 35, a WID test unit 36, a stencil test unit 37, a Z-comparison unit 38 and an α-blending unit 39, and reads the geometrical-operation processed three-dimensional data D1 out from the memory 4B to perform a drawing operation on the basis of the geometrical-operation processed three-dimensional data D1 by the constituent units 31 to 39. Further, the drawing operation processing unit 3 outputs three-dimensional graphics drawing data (data for representing the three-dimensional graphics on a two-dimensional display screen) which is finally obtained from α-blending unit 39 to the drawing execution unit 6.

The drawing execution unit 6 displays the three-dimensional graphics on the display screen of the display unit 7 on the basis of the three-dimensional graphics drawing data obtained from the α-blending unit 39.

The memory control unit 5 receives an input signal IN from the outside such as an event input and gives a control signal S5 to the memory 4B on the basis of the input signal IN to perform a read control of the geometrical-operation processed three-dimensional data D1 from the memory 4B. Specifically, when a plurality of geometrical-operation processed three-dimensional data D1 are stored in the memory 4B, according to the content of the input signal IN, the geometrical-operation processed three-dimensional data D1 to be read out from the memory 4B can be selected.

An internal constitution of the geometrical operation processing unit 2 will be discussed. The modeling/view conversion unit 21 performs a modeling conversion for converting vertex data of a three-dimensional coordinate system (body coordinate system) of the polygon defined by the polygon definition data 1 into a world coordinate system which is a unified three-dimensional virtual space, and further performs a view conversion for converting the view point into a view-point coordinate system directed towards a Z-axis direction in the world coordinate system.

The lighting calculation unit 22 calculates brightness of each vertex of the polygon using its normal vector. The view-port conversion unit 23 performs a view-port conversion for converting the brightness into a coordinate system in a screen on which the graphics are actually displayed.

After that, the perspective conversion unit 24 maps three-dimensional vertex data into a two-dimensional plane and performs a perspective processing (to enlarge a near object and downsize a far object) by perspective conversion. The clipping unit 25 cuts out a portion inside a frame (display screen) from the polygon. When the processing by the clipping unit 25 is completed, the polygon definition data 1 is converted into the geometrical-operation processed three-dimensional data D1.

FIG. 2 is an illustration of a relation between the polygon definition data 1 and the geometrical-operation processed three-dimensional data D1. As shown in this figure, the polygon definition data 1 recorded in an already-existing format is processed by the geometrical operation processing unit 2 into the geometrical-operation processed three-dimensional data D1.

The geometrical-operation processed three-dimensional data D1 has a three-dimensional coordinate (X, Y, Z), α-value (data indicating transmittance), color data (R, G, B) and texture coordinate data (U, V) for each of vertices (P1 to P3 in FIG. 2) constituting a polygon (triangle). Thus, the polygon definition data 1 is converted by the geometrical operation processing unit 2 into the geometrical-operation processed three-dimensional data D1 to be stored into the memory 4A. Specifically, when the memory 4A is a non-volatile semiconductor ROM such as EEPROM, the geometrical-operation processed three-dimensional data D1 (the content in the memory 4A) is written by a not-shown ROMing device (PROM writer) and when the memory 4A is a mask ROM, the geometrical-operation processed three-dimensional data D1 is used as input data for a not-shown semiconductor manufacturing CAD, being mask-ROMed. Further, by using a hard disk as the memory 4A, the geometrical-operation processed three-dimensional data D1 may be written therein.

The drawing operation processing unit 3 has a function of reading data from the memory 4B, and can perform a drawing operation on the basis of the geometrical-operation processed three-dimensional data D1 read out from the memory 4B.

The memory 4B is nonvolatile, and only if the memory 4A is nonvolatile, the memory 4A itself may be used also as the memory 4B, or another nonvolatile memory which stores the geometrical-operation processed three-dimensional data D1 like the memory 4A may be used. As nonvolatile memories, a nonvolatile semiconductor memory device such as ROM and EEPROM, a CD-ROM and the like may be used.

Next, an internal constitution of the drawing operation processing unit 3 will be discussed. The triangle set-up unit 31 judges which is the top vertex and which are left and right vertices of the top vertex among the pixels in the screen and what edge makes the triangle on the basis of triangle data defined by the geometrical-operation processed three-dimensional data D1, and the edge generation unit 32 generates left and right edge data of the triangle to be filled.

The scan-line change unit 33 generates the left and right edge data which is filled, for example, from left to right along a raster (pixel arrangement in two-dimensional array on a display such as a raster scan display) by interpolation on the screen. The pixel generation unit 34 reads texture data out from a not-shown external texture memory and generates new texture data by bilinear interpolation, trilinear interpolation and MIPMAP, to perform a pixel temporary generation for generating a pixel value to be displayed from a luminance value of the pixel and the texture data. Further, correspondence between the edge data and the texture data is made on the basis of respective texture coordinate data given to edge pixels constituting the edge data.

The bilinear interpolation refers to generation of new texture data from two texture data prepared in advance by interpolation. The MIPMAP refers to a mapping method in which mapping data is calculated resolution by resolution (a power of 2) in advance so that the size of a pixel may correspond to one mapping data.

Subsequently, the scissors test unit 35 judges whether or not the pixel having the value temporarily generated by the pixel generation unit 34 falls within a rectangular (screen) to be displayed. The WID (Window ID) test unit 36 judges whether or not the pixel exists inside a window to be displayed. The stencil test unit 37 judges whether or not a stencil serving as a mask for screen display can be written pixel by pixel in a given format.

After that, the Z-comparison unit 38 performs a comparison, on one pixel of a frame memory, between z-value of a source and z-value of destination (already written into a z-value storing memory corresponding to the same pixel in the frame memory on the basis of another geometrical-operation processed three-dimensional data D1), and when the new z-value (of the source) is smaller, its color value (RGB) is judged valid. The α-blending unit 39 performs a translucent display operation by calculation of blending based on α-value of the source and α-value of the destination, to obtain three-dimensional graphics drawing data on the basis of the temporarily-generated pixel value.

Further, the value of each edge pixel in the edge data obtained by the edge generation unit 32 and the scan-line change unit 33 and the pixel value obtained by pixel generation unit 34 are each data including at least xyzRGBa, where xyz is screen-display three-dimensional coordinate data, with x and y representing coordinates on the display screen and z representing the depth.

The drawing execution unit 6 captures the three-dimensional graphics drawing data (RGB α) pixel by pixel, which is obtained by performing the geometrical operation pipeline processing and the drawing operation pipeline processing on the polygon definition data 1 by the drawing operation processing unit 3 and writes the three-dimensional graphics drawing data into a predetermined region in the frame memory, to perform the pixel actual-generation, through which the three-dimensional graphics are actually displaced on (the two-dimensional screen of) the display unit 7.

Thus, the three-dimensional graphics system of the first preferred embodiment stores original data of the drawing operation consisting of the three-dimensional coordinate data, the color, the α-value and the like of the polygon, which is obtained through the geometrical operation on the basis of the polygon definition data 1 by the geometrical operation processing unit 2 into the memory 4A (memory 4B) in advance as the geometrical-operation processed three-dimensional data D1. That allows generation of the three-dimensional graphics drawing data only by the drawing operation processing unit 3 on the basis of the geometrical-operation processed three-dimensional data D1 stored in the memory 4B.

Therefore, after storing the geometrical-operation processed three-dimensional data D1 into the memory 4A, the three-dimensional graphics display system has only to be constituted of the drawing operation processing unit 3, the memory 4B, the memory control unit 5 and drawing execution unit 6 and the display unit 7 and does not need at least the geometrical operation processing unit 2.

As a result, the three-dimensional graphics display system does not need the execution by the geometrical operation pipeline processing unit, which has been needed in the background art, thereby ensuring reduction in cost and power consumption.

Further, though the data obtained after the execution by the clipping unit 25 is taken as the geometrical-operation processed three-dimensional data D1 in the first preferred embodiment, the data obtained after the execution by the modeling/view conversion unit 21, the lighting calculation unit 22, the view-port conversion unit 23 or the perspective conversion unit 24 may be stored in the memory 4A as the geometrical-operation processed three-dimensional data D1. In this case, provided with a drawing operation processing unit with a function of partial geometrical operation to perform the remainder of the geometrical operation on the basis of the geometrical-operation processed three-dimensional data D1 and the drawing operation instead of the drawing operation processing unit 3, the three-dimensional graphics display system can eliminate the necessity of at least part of the geometrical operation, thereby ensuring reduction in cost and power consumption.

<The Second Preferred Embodiment>

Figure 3:
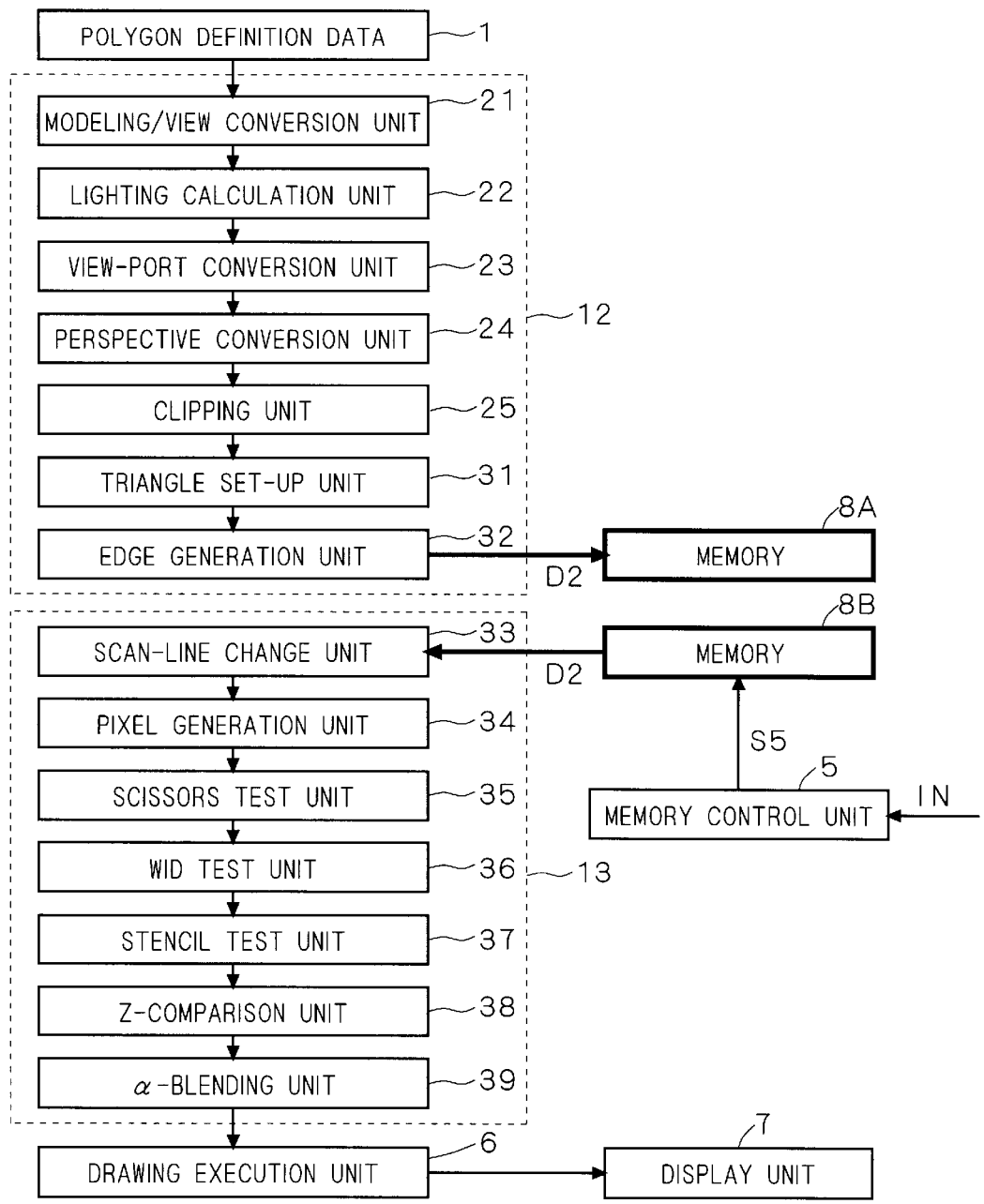
FIG. 3 is a block diagram showing a constitution of a three-dimensional graphics system in accordance with a second preferred embodiment of the present invention.

FIG. 3 is a block diagram showing a constitution of a three-dimensional graphics system in accordance with the second preferred embodiment of the present invention. As shown in this figure, the three-dimensional graphics system of the second preferred embodiment is constituted of a geometrical operation processing unit with a function of partial drawing operation 12, a drawing operation processing unit 13, memories 8A and 8B, the memory control unit 5 and the drawing execution unit 6.

The geometrical operation processing unit with a function of partial drawing operation 12 is constituted of the geometrical operation pipeline processing execution unit consisting of the modeling/view conversion unit 21, the lighting calculation unit 22, the view-port conversion unit 23, the perspective conversion unit 24 and the clipping unit 25 and part of the drawing operation pipeline processing execution unit consisting of the triangle set-up unit 31 and the edge generation unit 32, and performs all the geometrical operation and part of the drawing operation on the basis of the polygon definition data 1 by the constituent units 21 to 25, 31 and 32. The geometrical operation processing unit with a function of partial drawing operation 12 stores geometrical-operation processed three-dimensional data D2 finally obtained by the edge generation unit 32 into the memory 8A.

The drawing operation processing unit 13 is constituted of part of the drawing operation pipeline processing execution unit consisting of the scan-line change unit 33, the pixel generation unit 34, the scissors test unit 35, the WID test unit 36, the stencil test unit 37, the Z-comparison unit 38 and the α-blending unit 39, and reads the geometrical-operation processed three-dimensional data D2 obtained by performing the all the geometrical operation and part of the drawing operation from the memory 8B to perform part of the drawing operation on the basis of the geometrical-operation processed three-dimensional data D2 by the constituent units 33 to 39. The drawing operation processing unit 13 outputs three-dimensional graphics drawing data finally obtained by the α-blending unit 39 to the drawing execution unit 6.

The drawing execution unit 6 displays three-dimensional graphics on the display screen of the display unit 7 on the basis of the three-dimensional graphics drawing data obtained from the α-blending unit 39.

The memory control unit 5, like in the first preferred embodiment, receives the input signal IN from the outside such as an event input and gives the control signal S5 to the memory 8B on the basis of the input signal IN to perform a read control of the geometrical-operation processed three-dimensional data D2 from the memory 8B.

The memory 8B is nonvolatile, and only if the memory 8A is nonvolatile, the memory 8A itself may be used also as the memory 8B, or another nonvolatile memory which stores the geometrical-operation processed three-dimensional data D2 like the memory 8A may be used.

Further, as to the internal constitutions of the geometrical operation processing unit with a function of partial drawing operation 12 and the drawing operation processing unit 13, the elements identical to those of FIG. 1 are given the same reference signs and discussion thereof will be appropriately omitted.

Figure 4:
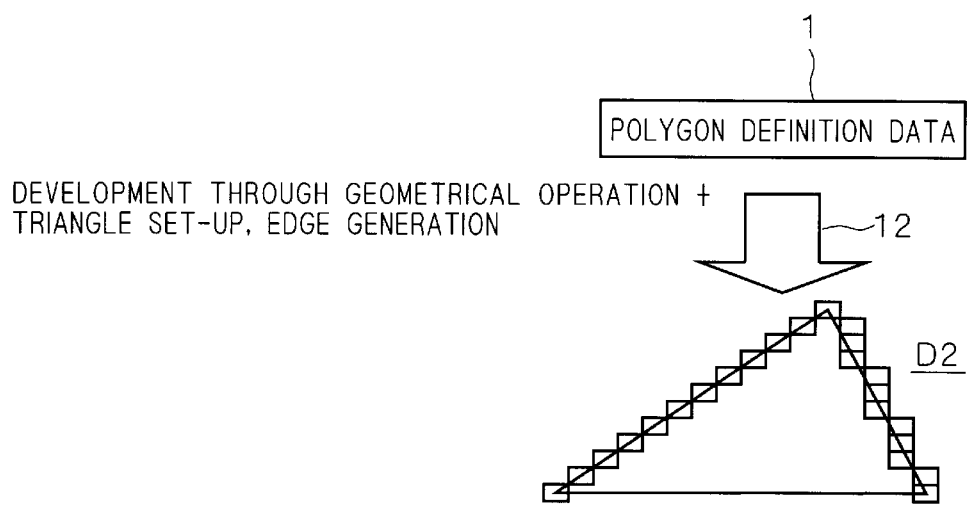
FIG. 4 is an illustration of a relation between the polygon definition data and the first-operation processed data in accordance with the second preferred embodiment.

FIG. 4 is an illustration of a relation between the polygon definition data 1 and the geometrical-operation processed three-dimensional data D2. As shown in this figure, the polygon definition data 1 recorded in an already-existing format is processed by the geometrical operation processing unit with a function of partial drawing operation 12 into the geometrical-operation processed three-dimensional data D2 which is edge data as indicated by aggregate of rectangles in FIG. 4.

The geometrical-operation processed three-dimensional data D2 has a three-dimensional coordinate (X, Y, Z), α-value (data indicating transmittance), color data (R, G, B) and texture coordinate data (U, V) for each edge pixel (represented by one rectangle in FIG. 4). Thus, the polygon definition data 1 is converted by the geometrical operation processing unit with a function of partial drawing operation 12 into the geometrical-operation processed three-dimensional data D2 to be stored into the memory 8A.

Thus, the three-dimensional graphics system of the second preferred embodiment stores original data of the drawing operation consisting of the three-dimensional coordinate data, the color, the α-value and the like of the polygon, which is obtained through all the geometrical operation and part of the drawing operation on the basis of the polygon definition data 1 by the geometrical operation processing unit with a function of partial drawing operation 12 into the memory 8A (memory 8B) in advance as the geometrical-operation processed three-dimensional data D2. That allows generation of the three-dimensional graphics drawing data only by the drawing operation processing unit 13 on the basis of the geometrical-operation processed three-dimensional data D2 stored in the memory 8B.

Therefore, after storing the geometrical-operation processed three-dimensional data D2 into the memory 8A, the three-dimensional graphics display system has only to be constituted of the drawing operation processing unit 13, the memory 8B, the memory control unit 5 and drawing execution unit 6 and the display unit 7 and does not need at least the geometrical operation processing unit with a function of partial drawing operation 12.

As a result, the three-dimensional graphics display system eliminates the necessity of all the geometrical operation and part of execution by the drawing operation processing unit, which have been needed in the background art, thereby ensuring lower cost and power consumption than those in the first preferred embodiment.

Further, though the data obtained after the execution by the edge generation unit 32 is taken as the geometrical-operation processed three-dimensional data D2 in the second preferred embodiment, the data obtained after the execution of the triangle set-up unit 31, the scan-line change unit 33, the pixel generation unit 34, the scissors test unit 35, the WID test unit 36, the stencil test unit 37 or the Z-comparison unit 38 may be stored in the memory 8A as the geometrical-operation processed three-dimensional data D2. In this case, provided with a processing unit to perform the remainder of the drawing operation on the basis of the geometrical-operation processed three-dimensional data D2 instead of the drawing operation processing unit 13, the three-dimensional graphics display system can eliminate the necessity of all the geometrical operation and at least part of the geometrical operation, thereby ensuring reduction in cost and power consumption.

<The Field of Application>

One of fields to which the three-dimensional graphics system shown in the first and second preferred embodiments is a three-dimensional graphics display used in e.g., portable game machines, amusement equipments and the like. These equipments each include the drawing operation processing unit 3, the memory 4B, the memory control unit 5, the drawing execution unit 6 and the display unit 7 in the first preferred embodiment, or the drawing operation processing unit 13, the memory 8B, the memory control unit 5, the drawing execution unit 6 and the display unit 7 in the second preferred embodiment.

<Others>

Figure 5:
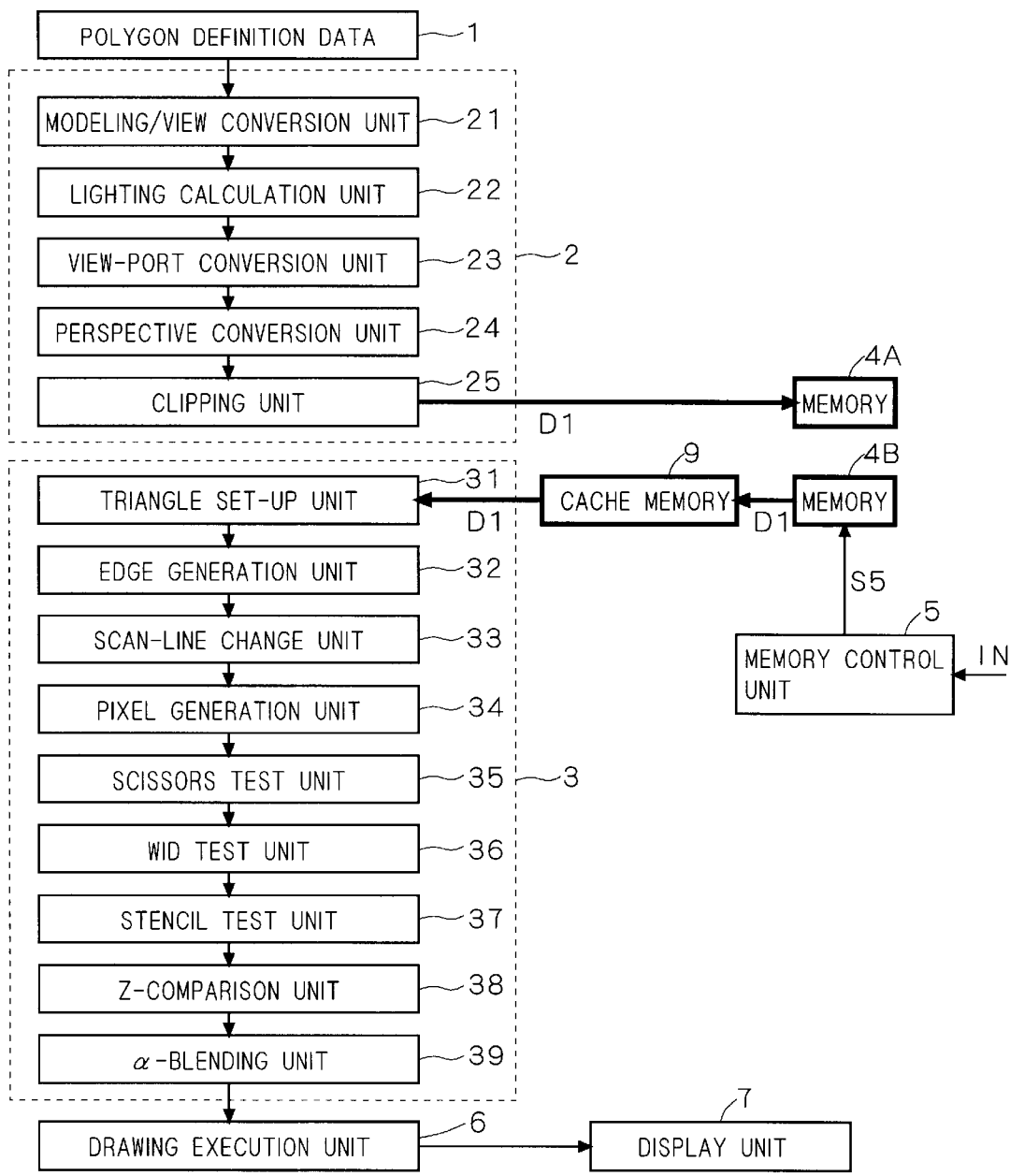
FIG. 5 is a block diagram showing an example of constitution of a three-dimensional graphics system using a cache memory.
Figure 6:
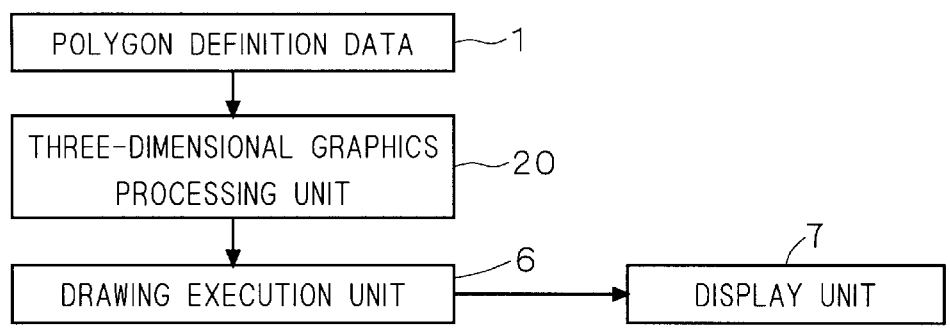
FIG. 6 is a block diagram showing a constitution of a three-dimensional graphics system in the background art.

Further, to perform the drawing operation by the three-dimensional graphics system of the first preferred embodiment at higher speed, as shown in FIG. 5, there may be a case where a cache memory 9 which can be read faster than the memory 4B is interposed between the memory 4B and the drawing operation processing unit 3 and the drawing operation processing unit 3 reads the geometrical-operation processed three-dimensional data D1 from the memory 4B through the cache memory 9, to ensure a faster read operation. Also in the second preferred embodiment shown in FIG. 3, providing a cache memory between the drawing operation processing unit 13 and the memory 8B naturally ensures a faster drawing operation, like in the first preferred embodiment.

While the invention has been shown and described in detail, the foregoing description is in all aspects illustrative and not restrictive. It is therefore understood that numerous modifications and variations can be devised without departing from the scope of the invention.

What is claimed is:

1. A three-dimensional graphics system, comprising:
   nonvolatile memory for storing first-operation processed data obtained by performing at least part of geometrical operation, said geometrical operation generating a three-dimensional polygon on the basis of data defining said three-dimensional polygon;
   data processing unit connected to said nonvolatile memory to read said first-operation processed data therefrom, for generating graphics drawing data corresponding to said three-dimensional polygon on the basis of said first-operation processed data; and
   display unit for displaying three-dimensional graphics on a two-dimensional screen on the basis of said graphics drawing data.

2. The three-dimensional graphics system according to claim 1, wherein
   said first-operation processed data includes three-dimensional data obtained by performing all said geometrical operation.

3. The three-dimensional graphics system according to claim 1, wherein
   said first-operation processed data includes three-dimensional data obtained by performing all said geometrical operation and part of a processing by which said graphics drawing data is obtained from said three-dimensional polygon.

4. The three-dimensional graphics system according to claim 1, wherein
   said first-operation processed data includes a plurality of first-operation processed data, and
   said three-dimensional graphics system further comprising:
   memory control unit receiving an external input signal, for controlling a read operation of selectively reading said first-operation processed data from said plurality of first-operation processed data stored in said nonvolatile memory on the basis of said external input signal.

5. The three-dimensional graphics system according to claim 1, further comprising:
   high-speed read memory means capable of a read operation faster than said nonvolatile memory, being interposed between said nonvolatile memory and said data processing unit,
   wherein said data processing unit reads said first-operation processed data from said nonvolatile memory through said high-speed read memory means.

6. The three-dimensional graphics system according to claim 1, wherein said at least part of geometrical operation includes an operation of converting coordinates of vertex data of the polygon into other coordinates.

7. A processor, comprising:
   memory control unit for reading data from a predetermined nonvolatile memory device storing first-operation processed data obtained by performing at least part of geometrical operation, said geometrical operation generating a three-dimensional polygon on the basis of data defining said three-dimensional polygon; and
   data processing unit for generating graphics drawing data corresponding to said three-dimensional polygon on the basis of said first-operation processed data read out from said predetermined nonvolatile storage device.

8. The processor according to claim 7, wherein
   said first-operation processed data includes three-dimensional data obtained by perfoming all said geometrical operation.

9. The processor according to claim 7, wherein
   said first-operation processed data includes three-dimensional data obtained by performing all said geometrical operation and part of a processing by which said graphics drawing data is obtained from said three-dimensional polygon.

10. The processor according to claim 7, wherein said at least part of geometrical operation includes an operation of converting coordinates of vertex data of the polygon into other coordinates.

11. A method of providing a processor with three-dimensional graphics data, said processor for processing drawing operation of drawing an image on a screen in accordance with said three-dimensional graphics data, said method comprising the steps of:

processing at least part of geometrical operation for data defining a three-dimensional polygon to generate an operation processed data; and storing said operation processed data into a nonvolatile memory to provide a processor with said first operation processed data as said three-dimensional graphics data.

12. The method according to claim 11, wherein said at least part of geometrical operation includes an operation of converting coordinates of vertex data of the polygon into other coordinates.

* * * * *